(12) United States Patent
Malofsky et al.

(10) Patent No.: US 9,181,365 B2
(45) Date of Patent: Nov. 10, 2015

(54) METHODS FOR ACTIVATING POLYMERIZABLE COMPOSITIONS, POLYMERIZABLE SYSTEMS, AND PRODUCTS FORMED THEREBY

(71) Applicant: Sirrus, Inc., Loveland, OH (US)

(72) Inventors: Bernard M. Malofsky, Bloomfield, CT (US); Adam G. Malofsky, Loveland, OH (US); Matthew M. Ellison, Mason, OH (US); Stanley C. Wojciak, New Britain, CT (US)

(73) Assignee: SIRRUS, INC., Loveland, OH (US)

( * ) Notice: Subject to any disclaimer, the term of this patent is extended or adjusted under 35 U.S.C. 154(b) by 0 days.

(21) Appl. No.: 14/388,624

(22) PCT Filed: Mar. 29, 2013

(86) PCT No.: PCT/US2013/034636
§ 371 (c)(1),
(2) Date: Sep. 26, 2014

(87) PCT Pub. No.: WO2013/149165
PCT Pub. Date: Oct. 3, 2013

(65) Prior Publication Data
US 2015/0073110 A1    Mar. 12, 2015

Related U.S. Application Data

(60) Provisional application No. 61/618,147, filed on Mar. 30, 2012.

(51) Int. Cl.
*C08F 2/00* (2006.01)
*C08F 4/00* (2006.01)
(Continued)

(52) U.S. Cl.
CPC .. *C08F 22/14* (2013.01); *C08F 2/38* (2013.01)

(58) Field of Classification Search
CPC .................................. C08F 22/14; C08F 2/38

USPC .................. 526/204, 213, 216, 217, 226, 321
See application file for complete search history.

(56) References Cited

U.S. PATENT DOCUMENTS

| 2,277,479 A | 3/1942 | D'Aiello |
| 2,313,501 A | 3/1943 | Bachman |

(Continued)

FOREIGN PATENT DOCUMENTS

| DE | 19508049 A1 | 9/1996 |
| GB | 432628 A | 7/1935 |

(Continued)

OTHER PUBLICATIONS

International Search Report for PCT Application No. PCT/US2013/034636 publised Oct. 3, 2013.
(Continued)

*Primary Examiner* — William Cheung
(74) *Attorney, Agent, or Firm* — The Dobrusin Law Firm, P.C.

(57) ABSTRACT

The exemplary embodiments disclosed herein relate to activating methods for initiation polymerization of methylene malonates and other polymerizable compositions. The polymerization may be activated by anionic or free radical mechanisms. Because the polymerization may occur very quickly upon contact between the activating agent and the polymerizable composition, methods are provide herein for separating or otherwise rendering the activating agent ineffective to initiate polymerization, until such a reaction is desired. The separation may be physical (separate packaging, separate application steps, encapsulation) or it may be based on latent-activation methods (activation precursors, UV activation). Products formed from the methods disclosed herein may include inks, adhesives, coatings, sealants, reactive moldings, fibers, films, sheets, medical polymers, composites, laminates and the like. Exemplary polymerizable compositions and products formed therefrom are environmentally sustainable, environmentally benign and/or biologically benign.

40 Claims, 4 Drawing Sheets

(51) Int. Cl.
  *C08F 4/12* (2006.01)
  *C08F 22/10* (2006.01)
  *C08F 22/14* (2006.01)
  *C08F 2/38* (2006.01)

(56) References Cited

U.S. PATENT DOCUMENTS

| | | |
|---|---|---|
| 2,330,033 A | 9/1943 | D'Aiello |
| 3,042,710 A | 7/1962 | Dickstein et al. |
| 3,197,318 A | 7/1965 | Halpern et al. |
| 3,221,745 A | 12/1965 | Coover et al. |
| 3,523,097 A | 8/1970 | Coover et al. |
| 3,557,185 A | 1/1971 | Ito et al. |
| 3,595,869 A | 7/1971 | Shuman |
| 3,758,550 A | 9/1973 | Eck et al. |
| 3,936,486 A | 2/1976 | Egger et al. |
| 3,940,362 A | 2/1976 | Overhurlts |
| 3,945,891 A | 3/1976 | Aal et al. |
| 3,966,562 A | 6/1976 | Mukushi et al. |
| 3,975,422 A | 8/1976 | Buck |
| 3,978,422 A | 8/1976 | Rheinfelder |
| 3,995,489 A | 12/1976 | Smith et al. |
| 4,001,345 A | 1/1977 | Gorton et al. |
| 4,004,984 A | 1/1977 | Margen |
| 4,018,656 A | 4/1977 | Rogers et al. |
| 4,035,243 A | 7/1977 | Katz et al. |
| 4,036,985 A | 7/1977 | Amato et al. |
| 4,046,943 A | 9/1977 | Smith et al. |
| 4,049,698 A | 9/1977 | Hawkins et al. |
| 4,056,543 A | 11/1977 | Ponticello |
| 4,079,058 A | 3/1978 | Ackermann et al. |
| 4,083,751 A | 4/1978 | Choi et al. |
| 4,102,809 A | 7/1978 | Smith et al. |
| 4,105,688 A | 8/1978 | Arni et al. |
| 4,140,584 A | 2/1979 | Margen |
| 4,148,693 A | 4/1979 | Williamson |
| 4,154,914 A | 5/1979 | Kuraya |
| 4,160,864 A | 7/1979 | Ponticello et al. |
| 4,176,012 A | 11/1979 | Bryant |
| 4,186,058 A | 1/1980 | Katz et al. |
| 4,186,060 A | 1/1980 | Katz et al. |
| 4,198,334 A | 4/1980 | Rasberger |
| 4,224,112 A | 9/1980 | Childs |
| 4,229,263 A | 10/1980 | Childs |
| 4,236,975 A | 12/1980 | Childs |
| 4,237,297 A | 12/1980 | Rody et al. |
| 4,243,493 A | 1/1981 | Gruber et al. |
| 4,256,908 A | 3/1981 | Nishimura et al. |
| 4,282,067 A | 8/1981 | Katz et al. |
| 4,282,071 A | 8/1981 | Sherrod |
| 4,313,865 A | 2/1982 | Teramoto et al. |
| 4,319,964 A | 3/1982 | Katz et al. |
| 4,329,479 A | 5/1982 | Yabutani et al. |
| 4,399,300 A | 8/1983 | Prange et al. |
| 4,411,740 A | 10/1983 | Flaningam et al. |
| 4,440,601 A | 4/1984 | Katz et al. |
| 4,440,910 A | 4/1984 | O'Connor |
| 4,443,624 A | 4/1984 | Prange et al. |
| 4,444,928 A | 4/1984 | Karrer |
| 4,450,067 A | 5/1984 | Angevine et al. |
| 4,504,658 A | 3/1985 | Narisada et al. |
| 4,510,273 A | 4/1985 | Miura et al. |
| 4,517,105 A | 5/1985 | Laemmle et al. |
| 4,539,423 A | 9/1985 | Itatani et al. |
| 4,556,649 A | 12/1985 | Salzburg et al. |
| 4,560,723 A | 12/1985 | Millet et al. |
| 4,578,503 A | 3/1986 | Ishikawa et al. |
| 4,584,064 A | 4/1986 | Ciais et al. |
| 4,698,333 A | 10/1987 | Fauss et al. |
| 4,720,543 A | 1/1988 | McPherson et al. |
| 4,727,701 A | 3/1988 | Figari |
| 4,736,056 A | 4/1988 | Smith et al. |
| 4,767,503 A | 8/1988 | Crescentini et al. |
| 4,769,464 A | 9/1988 | Sajtos |
| 4,783,242 A | 11/1988 | Robbins |
| 4,835,153 A | 5/1989 | Kabota et al. |
| 4,897,473 A | 1/1990 | Dombek |
| 4,914,226 A | 4/1990 | Di Trapani et al. |
| 4,931,584 A | 6/1990 | Bru-Magniez et al. |
| 4,932,584 A | 6/1990 | Yamazaki et al. |
| 5,021,486 A | 6/1991 | Galbo |
| 5,039,720 A | 8/1991 | Saatweber et al. |
| 5,064,507 A | 11/1991 | O'Donnell et al. |
| 5,142,098 A | 8/1992 | Bru-Magniez et al. |
| 5,162,545 A | 11/1992 | Etzbach et al. |
| 5,210,222 A | 5/1993 | O'Murchu |
| 5,227,027 A | 7/1993 | Topper |
| 5,259,835 A | 11/1993 | Clark et al. |
| 5,284,987 A | 2/1994 | Sikkenga et al. |
| 5,292,937 A | 3/1994 | Manning et al. |
| 5,312,864 A | 5/1994 | Wenz et al. |
| 5,334,747 A | 8/1994 | Steffen |
| 5,426,203 A | 6/1995 | Sohn et al. |
| 5,446,195 A | 8/1995 | Pacifici |
| 5,514,371 A | 5/1996 | Leung et al. |
| 5,514,372 A | 5/1996 | Leung et al. |
| 5,550,172 A | 8/1996 | Regula et al. |
| 5,567,761 A | 10/1996 | Song |
| 5,575,997 A | 11/1996 | Leung et al. |
| 5,582,834 A | 12/1996 | Leung et al. |
| 5,624,669 A | 4/1997 | Leung et al. |
| 5,693,621 A | 12/1997 | Toepfer et al. |
| 5,817,742 A | 10/1998 | Toepfer et al. |
| 5,817,870 A | 10/1998 | Haas et al. |
| 5,886,219 A | 3/1999 | Steffen |
| 5,902,896 A | 5/1999 | Bauer |
| 6,069,261 A | 5/2000 | Hoffmann et al. |
| 6,106,807 A | 8/2000 | Albayrak et al. |
| 6,210,474 B1* | 4/2001 | Romano et al. ............. 106/31.6 |
| 6,211,273 B1 | 4/2001 | Bru-Magniez et al. |
| 6,225,038 B1* | 5/2001 | Smith et al. ................ 430/523 |
| 6,238,896 B1 | 5/2001 | Ozaki et al. |
| 6,245,933 B1 | 6/2001 | Malofsky et al. |
| 6,284,915 B2 | 9/2001 | Hirase et al. |
| 6,291,703 B1 | 9/2001 | Schaerfl, et al. |
| 6,395,737 B1 | 5/2002 | Defossa et al. |
| 6,395,931 B1 | 5/2002 | Carvalho et al. |
| 6,413,415 B1 | 7/2002 | Weiss et al. |
| 6,420,468 B2 | 7/2002 | Bru-Magniez et al. |
| 6,440,461 B1 | 8/2002 | Bru-Magniez et al. |
| 6,512,023 B1 | 1/2003 | Malofsky et al. |
| 6,559,264 B1 | 5/2003 | Konig et al. |
| 6,610,078 B1 | 8/2003 | Bru-Magniez et al. |
| 6,613,934 B1 | 9/2003 | Jegelka et al. |
| 6,673,957 B2 | 1/2004 | Bartek et al. |
| 6,699,928 B2 | 3/2004 | Cobbley et al. |
| 6,716,355 B1 | 4/2004 | Hanemaaijer et al. |
| 6,750,298 B1 | 6/2004 | Bru-Magniez et al. |
| 6,794,365 B2 | 9/2004 | Al-Obeidi et al. |
| 6,841,064 B1 | 1/2005 | Weiss et al. |
| 6,936,140 B2 | 8/2005 | Paxton et al. |
| 7,109,369 B2 | 9/2006 | Nose et al. |
| 7,208,621 B2 | 4/2007 | Nose et al. |
| 7,305,850 B2 | 12/2007 | Tonkovich et al. |
| 7,553,989 B2 | 6/2009 | Sawabe et al. |
| 7,603,889 B2 | 10/2009 | Cypes et al. |
| 7,610,775 B2 | 11/2009 | Tonkovich et al. |
| 7,649,108 B2 | 1/2010 | Schal et al. |
| 7,659,423 B1 | 2/2010 | McArdle |
| 7,663,000 B2 | 2/2010 | Dekkers et al. |
| 7,771,567 B2 | 8/2010 | Rives et al. |
| 8,609,885 B2 | 12/2013 | Malofsky et al. |
| 8,884,051 B2 | 11/2014 | Malofsky et al. |
| 2002/0151629 A1* | 10/2002 | Buffkin et al. ................ 524/284 |
| 2004/0076601 A1 | 4/2004 | Bru-Magniez et al. |
| 2004/0220060 A1 | 11/2004 | Bartley et al. |
| 2006/0167267 A1 | 7/2006 | Chorghade et al. |
| 2007/0043145 A1 | 2/2007 | Beck et al. |
| 2007/0049655 A1 | 3/2007 | Yoshimune et al. |
| 2008/0131618 A1 | 6/2008 | Nakamura et al. |
| 2008/0187655 A1 | 8/2008 | Markle et al. |
| 2008/0227919 A9 | 9/2008 | Li et al. |
| 2008/0241485 A1 | 10/2008 | Shimohara et al. |
| 2010/0286433 A1 | 11/2010 | Malofsky et al. |

(56) References Cited

U.S. PATENT DOCUMENTS

| | | | |
|---|---|---|---|
| 2010/0286438 A1 | 11/2010 | Malofsky et al. | |
| 2011/0015406 A1 | 1/2011 | Umetani et al. | |
| 2011/0024392 A1 | 2/2011 | Sato et al. | |
| 2011/0164322 A1 | 7/2011 | Morozumi et al. | |
| 2014/0248485 A1 | 9/2014 | Malofsky et al. | |

FOREIGN PATENT DOCUMENTS

| | | | |
|---|---|---|---|
| GB | 975733 | | 11/1964 |
| JP | 2008/174494 | | 1/2007 |
| WO | 99/55394 | A1 | 11/1999 |
| WO | 2007/120630 | A2 | 10/2007 |
| WO | WO 2007/120630 | | 10/2007 |
| WO | 2010/129068 | A1 | 11/2010 |
| WO | 2011/059104 | A1 | 5/2011 |
| WO | 2011/161045 | A1 | 12/2011 |
| WO | 2012/054616 | A2 | 4/2012 |
| WO | 2012/054633 | A2 | 4/2012 |

OTHER PUBLICATIONS

Takagi et al.: Kogyo Kagaku Zasshi, Reaction of Active Methylene Radicals with Formaldehyde. L. Synthesis of Diethyl Methylenemalonate, 1953, 56, pp. 901-903, English abstract.

McNab, Kirk-Othmer Encyclopedia of chemical Technology, Pyrolysis, Flash Vacuum, 2009, John Wiley & Sons, Inc., pp. 1-26.

Block, "Diethyl bis (hydroxymethyl) malonate "Organic Syntheses, 1973, Coll. vol. 5, p. 381 [vol. 40, p. 27 (1960); Retrieved on Apr. 4, 2014 from internet: http://www.Orgsyn.org/content/pdfs/procedures/cv5p0381.pdf] p. 381, para 1. 1781-026WO.

Reddy et al. "An easy-to-use heterogeneous promoted zirconia catalyst for Knoevenagel condensation in liquid phase under solvent-free conditions." Journal of Molecular Catalysts A: Chemical 258 (2006) pp. 302-307.

M. Ware et al.: "DBU: An Efficient Catalyst for Knoeveganel Condensation under Solvent-free Condition," Bulletin of the Catalysis Society of India, (2007), vol. 6, pp. 104-106.

V. G. Nenajdenko et al.: "Reaction of 2-Methylene-1,3-Dicarbonyl Compounds Containing a CF3-Group with 1,3-Dienes," Tetrahedron, (2000), vol. 56, pp. 65496556.

J. S. Yadav et al.,: "Phosphane-Catalyzed Knoevenagel Condensation: a Facile Synthesis of a-Cyanoacrylates and a-Cyanoacrylonitriles," Eur, J, Org, Chem. (2004), pp. 546-551.

B. C. Ranu et al.: "Ionic Liquid as Catalyst and Reaction Medium- a Simple, Efficient and Green Procedure for Knoevenagel Condensation of Aliphatic and Aromatic Carbonyl Compounds Using a Task-Specific Basic Ionic Liquid," Euro. J. Org <http://Euro.J.Org>. Chem., (2006), pp. 3767-3770.

H, a, Oskooie et al.: "On Water: an Efficient Knoevenagel Condensation using 12- Tungstophosphoric Acid as a Reusable Green Catalyst," Synthetic Communications, (2006), Vol, 36, pp. 2819-2823.

H. Jiang et al.: "Inorganic Zinc Salts Catalyzed Knoevenagel Condensation at Room Temperature without Solvent," Preparative Biochemistry & Biotechnology, (2009), vol. 39, pp. 194-200.

T. Doi et al.: "Synthesis of Dimethyl gloiosiphne a by Way of Palladium-Catalyzed Domino Cyclization," T. Ora <htto://T.Ora>. Chem., (2007), vol. 72, pp. 36673671.

H. Jung et al,: "New and General Methods for the Synthesis of Arylmethylene Bis(3- Hydroxy- 2-Cyclohexene-1-Ones) and Xanthenediones by Edda and in(0Tf)3- Catalyzed One-Pot Domino Knoevenagei/Michael or Koevenagei/Michaei/Cyclodehydration Reactions," Bull. Korean Chem. Soc. (2009) vol. 30, No, 9, pp, 1989-1995.

P. Klemarczyk: "Adhesion Studies of Mixtures of Ethyl Cyanoacrylate with a Difunctional Cyanoacrylate Monomer and with other Electron-deficient Olefins," J. Adhesion, (1999), vol. 69, pp. 293-306.

P. Klemarwczyk: "A General Synthesis of 1,1 Disubstituted Electron Deficient Olefins and their Polymer Properties," Polymer,-(1998), vol. 39, No, I, pp. 173-181.

Gill, Charansingh, et al. "Knoevenagel condensation in neutral media: A simple and efficient protocol for the synthesis of electrophillic alkenes catalyzed by anhydrous ferric sulphate with remarkable reusability." Bulletin of the Catalysis Society of India 7 (2008): 153-157.

P, Ballesteros et al.: "D 1-tert-Butyl Methylenemalonate Propanedioic Acid, Methylene-, bis( 1,-dimethylethyl)esterl," Or!=)anic Syntheses. Coli. (1990), vol. 7, p. 142; (1986) vol. 64, p. 63.

A. M. Vetrova et al.: "Improvement of the Thermal Stability of Cyanoacrylate Adhesives," Polymer Science, Series D, (2009), vol. 2, No. 1, pp. 27-30.

A. C. Cope: "Condensation Reactions. I. The Condensation of Ketones with Cyanoacetic Esters and the Mechanism of the Knoevenagel Reaction," Condensation of Ketones with Cyanoacetic Esters, (1937), vol. 59, pp. 2327-2330.

G. Lai et al.: "Ionic Liquid Functionalized Silica Gel: Novel Catalyst and Fixed Solvent," Tetrahedron Letters (2006), vol. 47, pp. 6951-6953.

J. R. Harjani et al.: "Lewis Acidic Ionic Liquids for the Synthesis of Electrophilic Alkenes; via the Knoevenagel Condensation," Tetrahedron Letters, (2002), vol. 43, pp. 1127-1130.

P. Ballesteros et al.: "Synthesis of Di-tent-Butyl Methylenemalonate, a Sterically Hindered 1,1-Dicarbonyl Alkene," J. Ora <htto://J.Ora>. Chem, (1983), vol. 48, pp. 3603-3605.

IPRP and Written Opinion for PCT/US2013/034636 mailed Oct. 9, 2014.

M. Matziari et al. Active Methylene Phosphinic Peptides: A new Diversification Approach Organic Letters 2006 vol. 8, No. 11 pp. 2317-2319 May 5, 2006.

* cited by examiner

METHODS FOR ACTIVATING POLYMERIZABLE COMPOSITIONS, POLYMERIZABLE SYSTEMS, AND PRODUCTS FORMED THEREBY

CROSS REFERENCE TO RELATED APPLICATIONS

This application is a National Stage of International Application No. PCT/US13/34636 filed Mar. 29, 2013, which claims priority to U.S. Provisional Patent Application 61/618, 147, filed Mar. 30, 2012, entitled Methods for Activating Polymerizable Compositions, Polymerizable Systems, and Products Formed Thereby, the contents of which in its entirety is hereby incorporated herein by reference.

INCORPORATION BY REFERENCE

All documents cited or referenced herein and all documents cited or referenced in the herein cited documents, together with any manufacturer's instructions, descriptions, product specifications, and product sheets for any products mentioned herein or in any document incorporated by reference herein, are hereby incorporated by reference, and may be employed in the practice of the invention.

BACKGROUND OF THE INVENTION

1. Field of the Invention

Exemplary embodiments disclosed herein relate to improved methods for activating the cure of certain chain growth and cross-linkable polymerizable compositions of monomers, oligomers, and/or polymers through introduction of an activating agent, and to the use and/or application of such as commercial products and compositions, including, for example, monomer-based products (e.g., inks, adhesives, coatings, sealants or reactive molding) and polymer-based products (e.g., fibers, films, sheets, medical polymers, composite polymers and surfactants).

2. Background

Methylene malonates are compounds having the general formula (I):

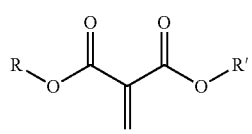

wherein R and R' may be the same or different and may represent nearly any substituent or side-chain. Such compounds have been known since 1886 where the formation of diethyl methylene malonate was first demonstrated by W. H. Perkin, Jr. (Perkin, Ber. 19, to 1053 (1886)).

However, earlier methods for producing methylene malonates suffer significant deficiencies that preclude their use in obtaining commercially viable monomers. Such deficiencies include unwanted polymerization of the monomers during synthesis, formation of undesirable side products, degradation of the product, insufficient and/or low yields, and ineffective and/or poorly functioning monomer product. These problems have impinged on their practical use in the production of commercial and industrial products.

Certain co-inventors of the instant application have recently filed patent applications on improved methods of synthesis of methylene malonates, namely, PCT/US11/056903 Synthesis of Methylene Malonates Substantially Free of Impurities, and PCT/US11/056926 Synthesis of Methylene Malonates Using Rapid Recovery in the Presence of a Heat Transfer Agent. The synthesis procedures provided therein result in improved yields of heretofore elusive high quality methylene malonates and other polymerizable compositions.

With the advent of improved synthesis processes for disubstituted vinyl monomers such as methylene malonates, there exists a need in the art for suitable methods of activating polymerization in order to provide the desired outcomes, including new classes of commercially viable products.

The polymerizable compositions are amenable to chain-building and/or cross-linking polymerization by anionic or free radical initiation and have the potential to form the basis of a highly valuable and large-scale platform for the chemical synthesis and formulation of new chemical products, including inks, adhesives, coatings, sealants, moldings, fibers, films, sheets, medical polymers, composites, surfactants and the like.

For example, in the area of addition polymerization, primarily with acrylates and methacrylates, the historic systems for activation have involved relatively high levels of catalyst, typically 2% by weight or more for most catalysts, accelerator and/or activator components. As such, significant mixing events, often coupled with substrate priming, were required to facilitate an appropriate polymerization (i.e., speed, degree of polymerization, etc.). Such requirements could be found, for example, in systems used in bonding inactive surfaces. Therefore, there is a need in the art for more facile polymerization initiation and management tools. Such improvements are not readily apparent given the state of the prior art.

As known in the art, materials such as cyanoacrylates may not require such high levels of catalysts, accelerators or activators. However, because such systems exhibit poor properties, there has not been an impetus in the art to develop improved methods of activation, particularly on inactive substrates, beyond the inclusion of additives such as calixerenes, crown ethers and the like to facilitate the strengthening or creation of anionic initiators on inactive substrate surfaces. Indeed, primers are often used to improve performance. It has been found that substantially perfect stoichiometric mixing is required with these systems to initiate polymerization, especially for spanning large distances from the initiation event (e.g., primed surface), large gap filling of 10 mils or more, potting applications, or molded parts. Again, improvement in performance is desired in the art with regard to ranges of physical and chemical properties.

Given the state of the art, new solutions not immediately apparent are required to to provide the desired outcomes, especially for consistently reactive formulations with long term shelf life at ambient temperatures. Further, there is a need in the art to provide a polymerization system including an addition polymerizable composition and a suitable initiation component or components provided at low levels and without the need for perfect or stoichiometric mixing.

Further, there is a need in the art for polymerizable systems that provide consistent reactivity, that are storable under ambient conditions, and that are substantially free of impurities that affect reactivity and shelf life.

As already noted, a consistently reactive, ambiently storable set of reactive formulations is important to these aforementioned products, their use and incorporation into resultant articles. Accordingly, those products must be substantially free of any impurities that may interfere with consistent, high speed reactivity and long term, ambient storage and shelf life.

Accordingly, there is now provided polymerizable systems able to provide on-demand, high speed, 100% or near 100% solids, low catalyst requiring, entirely or substantially energy free curing, ambient curing, optionally crosslinking polymerizable systems that may be by design environmentally, biologically and/or metabolically compatible to meet clear and heretofore unmet needs.

BRIEF DESCRIPTION OF THE DRAWINGS

So that those having ordinary skill in the art to which the subject invention pertains will more readily understand how to make and use the invention as described herein, preferred embodiments thereof will be described in detail below, with reference to the drawings, wherein.

SUMMARY OF THE INVENTION

Figure 1A:
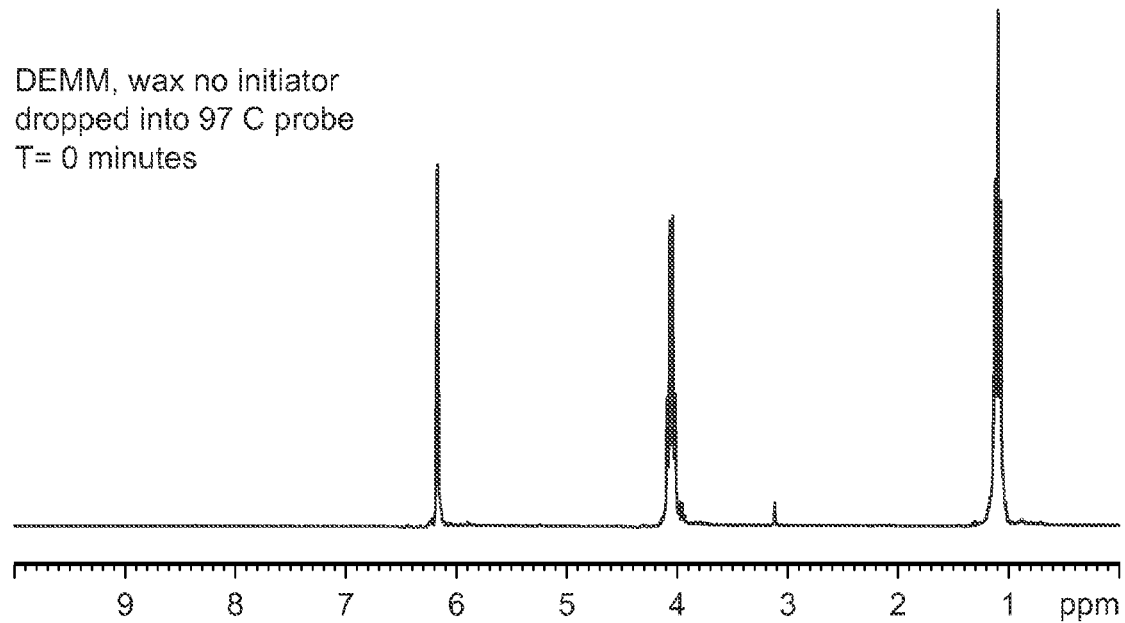
FIG. 1 shows the NMR spectra for DEMM and wax with no initiator at time=0 (FIG. 1a) and 30 minutes (FIG. 1b) at 97° C.

Exemplary embodiments disclosed herein have a broad range of potential applications. In exemplary embodiments disclosed herein, di-activated vinyl monomers and methods of activating their polymerization provide advantages not shown in the prior art.

Certain exemplary embodiments disclosed herein provide various activation methods for initiating polymerization of a polymerizable composition. In certain exemplary embodiments, an activating agent is separated from the polymerizable composition in some manner. The activating agent may be physically separated, temporarily inert until energized, available after action on an activating agent precursor, and the like. Polymerization of the polymerizable composition may begin immediately when the activating agent is brought into activating engagement with the polymerizable composition. Alternately, the cure time may be tailored depending on the desired outcome.

Exemplary embodiments disclosed herein further provide products formed by the methods disclosed herein including, but not limited to inks, adhesives, reactive pressure sensitive adhesives, reactive hot melt adhesives, coatings, sealants, moldings, fibers, films, sheets, medical polymers, composites, surfactants, and the like.

In one aspect, the invention provides a polymerizable system comprising:
 a polymerizable composition; and
 polymerization activator carried in inactive engagement in the polymerizable composition;
 wherein the polymerizable composition comprises a di-activated vinyl compound, and wherein the polymerization activator is made available to polymerize the polymerizable composition upon a phase change.

In certain embodiments of the polymerizable system according to the invention, the phase change is enabled by a change in the temperature of the system, dissolving the polymerization activator, addition of a solubilizing plasticizer, releasing the polymerization activator from a physical separation means, or converting the polymerization activator from an inert state to an active state.

In other embodiments of the polymerizable system according to the invention, the polymerizable composition comprises a methylene malonate, a methylene beta-ketoester or a methylene beta-diketone and wherein the polymerization activator is converted from the inert state to the active state upon activation by UV radiation. In still other embodiments, the polymerizable composition is at least one of a methylene malonate, a methylene beta-ketoester, a methylene beta-diketone, a dialkyl disubstituted vinyl, a dihaloalkyl disubstituted vinyl, whether a monofunctional, difunctional, or multifunctional form thereof.

In still other embodiments of the polymerizable system according to the invention, the polymerization activator is at least one of a base, a base enhancer, a base creator, or a base precursor. In certain embodiments, the polymerization activator comprises a basic material selected from a strong base (pH over 9), a moderately strong base (pH from 8-9), or a weak base (pH from over 7 to 8), or a combination thereof. In other embodiments, the polymerization activator comprises a basic material selected from an organic material, an inorganic material or an organo-metallic material, or a combination thereof. In still other embodiments, the polymerization activator is at least one member selected from: sodium acetate; potassium acetate; acid salts of sodium, potassium, lithium, copper, and cobalt; tetrabutyl ammonium fluoride, chloride, and hydroxide; an amine whether primary, secondary or tertiary; an amide; salts of polymer bound acids; benzoate salts; 2,4-pentanedionate salts; sorbate salts; propionate salts; secondary aliphatic amines; piperidene, piperazine, N-methylpiperazine, dibutylamine, morpholine, diethylamine, pyridine, triethylamine, tripropylamine, triethylenediamine, N,N-dimethylpiperazine, butylamine, pentylamine, hexylamine, heptylamine, nonylamine, decylamine; salts of amines with organic monocarboxylic acids; piperidine acetate; metal salt of a lower monocarboxylic acid; copper(II) acetate, cupric acetate monohydrate, potassium acetate, zinc acetate, zinc chloracetate, magnesium chloracetate, magnesium acetate; salts of acid containing polymers; salts of polyacrylic acid co-polymers. In certain embodiments, the polymerization activator is encapsulated in a wax, or is provided in inactive engagement with the polymerizable composition by chemical inactivation.

In certain embodiments of the polymerizable system according to the invention, the polymerization activator is present in the polymerizable composition in amounts less than about 2%, preferably less than 1%, and more preferably less than about 0.5%, even more preferably less than 0.1% by weight of the polymerizable composition.

In some embodiments of the polymerizable system according to the invention, the polymerizable composition is provided through an environmentally sustainable process. In other embodiments, the polymerizable composition is environmentally benign, biologically benign, or both.

In still other embodiments of the polymerizable system according to the invention, the polymerizable composition is curable at ambient temperature. In certain embodiments, the polymerizable composition is storable at ambient temperature.

In another aspect, the invention provides a polymerizable system comprising:
 a polymerizable composition; and
 polymerization activator physically separated from the polymerizable composition;
 wherein the polymerizable composition comprises a di-activated vinyl compound, and wherein the polymerization activator is able to initiate polymerization upon contact with the polymerizable composition without substantial mixing.

In certain embodiments of the polymerizable system wherein the polymerization activator physically separated from the polymerizable composition, the physical separation is achieved by storing the activating agent and the polymerizable composition in separate locations within an applicator means. In exemplary embodiments, the applicator means is an aerosol spray device. In other embodiments, the physical separation is achieved by initially applying the polymerization activator to at least a portion of a substrate, followed by applying the polymerizable composition to the portion of the substrate. In still other embodiments, the physical separation is achieved by providing the polymerization activator in or on at least a portion of a substrate.

In certain other embodiments of the polymerizable system wherein the polymerization activator physically separated from the polymerizable composition, the polymerization activator is in an inert state and wherein the polymerizable system further comprises an converting agent able to convert the polymerization activator from the inert state to an active state.

In certain embodiments, the converting agent is a base enhancer or a base creator.

In other embodiments, the polymerization activator is provided in an amount effective to substantially cure the polymerizable composition. In certain embodiments, the amount effective to substantially cure the polymerizable composition is at least one of the following: less than 2%, less than 1%, less than 0.5%, and less than 0.1% by weight of the polymerizable composition.

In still other embodiments, the polymerization activator is provided as a dispersion, a suspension, as a solute in a solvent, as an encapsulant.

In yet another aspect, the invention provides a method of initiating the polymerization of a polymerizable composition comprising contacting a polymerizable composition with polymerization activator without substantial mixing, without addition of heat, without exposure to radiation, or any combination thereof, wherein the polymerizable composition comprises a di-activated vinyl compound.

In certain embodiments of the method of the invention, the polymerization activator contacts the polymerizable composition inside a dispenser immediately prior to dispensing onto a substrate. In some embodiments, the polymerizable activator exits a dispenser from a first pathway and the polymerizable composition exits the dispenser from a second pathway, and wherein the polymerizable activator contacts the polymerizable composition immediately after exiting the dispenser. In still other embodiments, the polymerizable composition is applied to at least a portion of a substrate at substantially the same time that the polymerization activator is applied to the substrate portion, wherein the polymerizable composition contacts and mixes with the polymerization activator sufficiently to initiate polymerization.

In certain embodiments of the method of the invention, the polymerization activator comprises a basic material selected from a strong base (pH over 9), a moderately strong base (pH from 8-9), or a weak base (pH from over 7 to 8), or a combination thereof. In some embodiments, the polymerization activator comprises a basic material selected from an organic material, an inorganic material or an organo-metallic material, or a combination thereof. In still other embodiments, the polymerization activator is at least one member selected from: sodium acetate; potassium acetate; acid salts of sodium, potassium, lithium, copper, and cobalt; tetrabutyl ammonium fluoride, chloride, and hydroxide; an amine whether primary, secondary or tertiary; an amide; salts of polymer bound acids; benzoate salts; 2,4-pentanedionate salts; sorbate salts; propionate salts; secondary aliphatic amines; piperidene, piperazine, N-methylpiperazine, dibutylamine, morpholine, diethylamine, pyridine, triethylamine, tripropylamine, triethylenediamine, N,N-dimethylpiperazine, butylamine, pentylamine, hexylamine, heptylamine, nonylamine, decylamine; salts of amines with organic monocarboxylic acids; piperidine acetate; metal salt of a lower monocarboxylic acid; copper(II) acetate, cupric acetate monohydrate, potassium acetate, zinc acetate, zinc chloracetate, magnesium chloracetate, magnesium acetate; salts of acid containing polymers; salts of polyacrylic acid co-polymers.

In certain embodiments of the method of the invention, the polymerization activator is provided in an amount effective to substantially cure the polymerizable composition. In other embodiments, the amount effective to substantially cure the polymerizable composition is at least one of the following: less than 2%, less than 1%, less than 0.5%, and less than 0.1% by weight of the polymerizable composition. In specific embodiments, the polymerization activator initiates polymerization of the polymerizable composition by an anionic attack mechanism or by a free radical mechanism.

In certain embodiments of the method of the invention, the polymerization activator is in the form of a precursor. In specific embodiments, method of the invention further comprises the step of converting the precursor into the polymerization activator.

In other embodiments of the method of the invention, the polymerizable composition is selected from the group consisting of methylene malonates, methylene b-ketoesters, methylene β-di-ketones, dialkyl disubstitued vinyls, dihaloalkyl disubstituted vinyls, the monofunctional, difunctional, or multifunctional form thereof, and any combination thereof.

These and other purposes and advantages of the present invention will be set forth in and apparent from the description that follows. Additional advantages of the invention will be realized and attained by the methods and systems particularly pointed out in the written description and claims hereof.

DESCRIPTION OF THE INVENTION

Abbreviations and Acronyms

A comprehensive list of the abbreviations used by organic chemists of ordinary skill in the art appears in The ACS Style Guide (third edition) or the Guidelines for Authors for the Journal of Organic Chemistry. The abbreviations contained in said lists, and all abbreviations utilized by organic chemists of ordinary skill in the art are hereby incorporated by reference. For purposes of this invention, the chemical elements are identified in accordance with the Periodic Table of the Elements, CAS version, Handbook of Chemistry and Physics, 67th Ed., 1986-87.

DEFINITIONS

Unless defined otherwise, all technical and scientific terms used herein have the meaning commonly understood by a person skilled in the art to which this invention belongs. The following references provide one of skill with a general definition of many of the terms used in this invention: Singleton et al., Dictionary of Microbiology and Molecular Biology (2nd ed. 1994); The Cambridge Dictionary of Science and Technology (Walker ed., 1988); The Glossary of Genetics, 5th Ed., R. Rieger et al. (eds.), Springer Verlag (1991); and Hale & Marham, The Harper Collins Dictionary of Biology (1991). As used herein, the following terms have the meanings ascribed to them below, unless specified otherwise.

As used herein, the term "methylene malonate" refers to a compound having the core formula —O—C(O)—C(=CH$_2$)—C(O)—O—. Diethyl methylene malonate monomer is a methylene malonate having two ethyl end groups and is denoted DEMM herein. Dimethyl methylene malonate monomer has two methyl end groups and is denoted DMMM or D3M herein.

As used herein, the term "polymerizable composition" refers to a monomeric, oligomeric, or polymeric composition or mixture comprising molecules that are able to be polymerized by chain extension, cross-linking, or both.

As used herein, the term "monofunctional" refers to an addition monomer, for example a methylene malonate, having only one addition polymerizable group.

As used herein, the term "difunctional" refers to an addition polymerizable function containing monomer, oligomer, resin or polymer, with two such addition polymerizable groups, such as two methylene malonate groups, enabling crosslinking functionality.

As used herein, the term "multifunctional" refers to an addition polymerizable function containing monomer, oligomer, resin or polymer, with more than one such addition polymerizable groups, such as three or more methylene malonate groups. Thus, "difunctional" is a sub-class of "multifunctional."

As used herein, the term "activating agent" refers to any agent suitable for initiating polymerization of the polymerizable composition, regardless of form or composition.

As used herein, the terms "separate," or "separated" with reference to the activating agent means that the activating agent is not able to act on the polymerizable composition in a manner to initiate polymerization. The activating agent may be physically separated or rendered chemically inert or hindered with respect to the polymerizable composition in some way.

As used herein, the term "activating agent precursor" refers to any agent that is limited in its ability to initiate polymerization, but which is capable of direct or indirect transformation into an activating agent as disclosed herein.

As used herein, the term "inactivate engagement" means that the activating agent is incapable of "activating" or "initiating" the polymerization of the polymerizable composition. An inactivating engagement may be achieved by any suitable means, including by physical separation of the activating agent from the polymerizable composition, or by providing the activating agent in a precursor form that is incapable of activating polymerization until the precursor form is converted to the activating agent, e.g., by administering an effective amount of ultraviolet illumination or radiation.

As used herein, the term "polymerizable system" or "formulated system" refers to a polymerizable composition and a suitable activating agent in combination, with or without other formulation additives.

As used herein, the term "formulation additives" refers to additives included in a formulated system to enhance physical or chemical properties thereof and to provide a desired result. Such formulation additives include, but are not limited to, dyes, pigments, toughening agents, impact modifiers, rheology modifiers, plasticizing agents, thixotropic agents, natural or synthetic rubbers, filler agents, reinforcing agents, thickening agents, opacifiers, inhibitors, fluorescence markers, thermal degradation reducers, thermal resistance conferring agents, surfactants, wetting agents, and stabilizers.

As used herein the term "base" refers to a component having at least one electronegative group capable of initiating anionic polymerization.

As used herein the term "base precursor" refers to a component that may be converted to a base upon being acted upon in some manner, e.g., application of heat, chemical reaction, or UV activation.

As used herein the term "base converters" refers to an agent that is capable of acting in some manner to generate or convert another component into an active base.

As used herein, the term "base enhancer" refers to an agent that is capable of acting in some manner to improve or enhance the basicity of an agent.

As used herein, the terms "di-activated vinyl compound" or "disubstituted vinyl compound" refers to a molecule having at least one group having a di-activated vinyl group represented by -EWG-C(=CH2)-EWG-; where EWG is an electron withdrawing group, other than a cyanoacrylate.

Unless otherwise identified, all percentages (%) are "percent by weight."

Thermal Analysis

For TGA: All experiments were performed using a TA Q50 TGA. TGA stands for thermal gravimetric analysis. It is a very sensitive instrument that measures how weight changes as a sample is heated. For these experiments, samples were heated at a rate of 10 C/min to 600 C. in nitrogen until 500 C. At 500 C. the instrument switched over to air to help burn off more material. The data collected was then plotted as weight percent over temperature and the temperature at 5% mass loss was recorded. This temperature is considered the decomposition temperate.

For DSC Polymer Samples: All experiments were performed using a TA Q2000 DSC with a RCS 90 cooling system. DSC stands for differential scanning calorimetry and it measures the amount of heat it takes to raise the temperature of a reference and a sample at the same rate. Then comparing the sample and reference heat flows, one can see the sample's phase changes by the energy released or required. For these experiments, samples were heated at 10 C./min to just below their decomposition temperature (as determined by TGA), then cooled at 20 C./min to −60 C., and then heated again to just below the decomposition temperature. The first heat is required to erase the materials thermal history and the second heat is the one used to determine thermal properties such as glass transition temperature (Tg), crystallization temperature (Tc), and melting point (Tm).

Exemplary Embodiments

The structures, materials, compositions, and methods described herein are intended to be representative examples of the invention, and it will be understood that the scope of the invention is not limited by the scope of the examples. Those skilled in the art will recognize that the invention may be practiced with variations on the disclosed structures, materials, compositions and methods, and such variations are regarded as within the ambit of the invention.

Exemplary embodiments disclosed herein provide novel and nonobvious improvements in the use of di-activated vinyl compounds, including methylene malonate monomers and other polymerizable compositions (e.g., monomers, oligomers, and/or polymers). Of particular interest are polymerizable di-substituted, di-activated vinyl compounds such as, but not limited to, methylene malonates, methylene β-ketoesters, methylene β-di-ketones, dialkyl disubstitued vinyls, dihaloalkyl disubstituted vinyls, whether monofunctional, difunctional or multifunctional monomers, oligomers or polymers.

Such polymerizable compositions and their associated monomeric and polymeric-based products could be useful in both industrial (including household) and medical applications. Additionally, unlike many other monomers, certain exemplary monomers and their products can be produced via sustainable routes as well as be designed to be environmentally and/or biologically benign and as such many of the products can be generally regarded as "green."

Activating agents suitable for use in the practice of the present invention vary widely. Selection of the specific activating agent depends upon the chemistry of the polymerizable composition, the nature of cure mechanisms employed, the method and/or conditions by which the polymerization is to be effectuated, the end-use application and/or the nature of any substrate employed in the practice of the invention. The activating agents may include those involved with the polymerization of one or more polymerizable monomers, prepolymers, and/or low molecular weight polymers or oligomers, including for example, activators, co-activators, accelerators, co-accelerators, catalysts, co-catalysts, initiators and co-initiators. Of general interest for the disubstituted vinyl monomers such as methylene malonates are bases, base precursors, base converters, and base enhancers. For convenience, unless otherwise stated herein, the term "activating agent" is used herein to mean any and all such agents.

In exemplary embodiments, the required amount of activating agent may be no greater than about 2% by weight of the polymerizable composition, preferably less than about 1%, preferably less than about 0.5% by weight of the polymerizable composition, and even more preferably, less than about 0.1% by weight of the polymerizable composition. In other exemplary embodiments, the desired amount of activating agent may be defined as the minimum amount necessary to achieve effective polymerization in a desired application, herein "activating amount." For certain exemplary embodiments, the amount of activating agent required to initiate polymerization is greatly reduced as compared to known reactive systems such as epoxies, polyurethanes and the like.

Exemplary activating agents may include certain basic compounds. Such basic activating agents may initiate polymerization primarily through anionic attack. Other exemplary activating agents may initiate polymerization primarily through free radical mechanisms.

Exemplary activating agents include any material capable of initiating and/or speeding the rate of cure of the polymerizable compositions. In certain embodiments, the activating agents include materials capable of speeding or enabling the cure through a volume of the polymerizable composition. Exemplary activating agents include, but are not limited to, sodium or potassium acetate; acrylic, maleic or other acid salts of sodium, potassium, lithium, copper, cobalt, or other metal cations; salts such as tetrabutyl ammonium fluoride, chloride, bromide, iodide or hydroxide; or chemically basic materials such as amines and amides; or salts of polymer bound acids; benzoate salts; 2,4-pentanedionate salts; sorbate salts; or propionate salts.

Certain activating agents will initiate polymerization substantially instantaneously on contact with certain polymerizable compositions at ambient temperature, and without introduction of outside forces (e.g., stirring, mixing) or energy (e.g., heat, UV). Further, in exemplary embodiments, initiation of polymerization does not require precise stoichiometric amounts. In exemplary embodiments disclosed herein, the activating agent is brought into "activating engagement" with the polymerizable composition in a manner designed to induce polymerization. For certain applications, it is desirous to prevent such activating engagement between the activating agent and the polymerizable composition until such polymerization is desired.

In exemplary embodiments, polymerization of systems disclosed herein may be controlled to occur either on contact of the polymerizable composition with the activating agent or at a later time. In other exemplary embodiments, the system may be designed so that polymerization is completed before contact with a substrate or after such contact.

Thus, certain exemplary embodiments disclosed herein provide "separation" of the activating agent from the polymerizable composition to prevent premature polymerization. In other cases, the separation of the activating agent from the polymerizable composition allows for ease of delivery in a commercial product. In certain exemplary embodiments, the polymerizable composition and a suitable activating agent may be available as a prepackaged system, wherein the reactive components are separated in some fashion. Still other means of separating the activating agent from the polymerizable composition are discussed in greater detail below.

In some exemplary embodiments, the activating agent may be initially provided as an "activating agent precursor" as defined herein. In other exemplary embodiments, the activating agent may be inherently present on or applied to a surface to be contacted with the polymerizable composition. In other exemplary embodiments, the activating agent may be provided as a primer on a surface to be contacted with the polymerizable composition.

In exemplary embodiments disclosed herein, the activating agent may be derived from a latent activating agent precursor. In other embodiments, the activating agent may be physically separated from the polymerizable composition as part of a polymerizable system. In other embodiments, the activating agent may be in contact with the polymerizable composition in an inactive or incompatible state or phase. These embodiments of the activating agent are provided as examples only and not by way of limiting the invention.

Formulated systems utilizing exemplary polymerizable compositions may also include any of the following: dyes, pigments, toughening agents, impact modifiers, rheology modifiers, plasticizing agents, thixotropic agents, natural or synthetic rubbers, filler agents, reinforcing agents, thickening agents, opacifiers, inhibitors, fluorescence markers, thermal degradation reducers, thermal resistance conferring agents, surfactants, wetting agents, stabilizers, and other additives as needed to achieve a desired result.

Those having skill in the relevant art will appreciate that as part of a system, the formulation additives may be carried in or with the activating agent, the polymerizable composition, or any combination thereof in order to achieve the desired result.

Polymerizable compositions based on methylene malonate and other polymerizable compositions may be incorporated into any number of compositions and products including but not limited to monomer-based compositions, oligomer-based compositions and polymer-based compositions.

In an exemplary embodiment, a polymerizable system (e.g., a formulated product) may include an activating agent carried in, but not in activating engagement with, a polymerizable composition. However, to an end user, the system has an appearance as a "one-part" system. This appearance is facilitated by the low amounts of activating agent required. For example, if a 0.1% by weight amount of activating agent is required for a to particular system, then for 1 gram of activating agent, 1000 grams of polymerizable composition can be activated over time. Thus, an exemplary embodiment provides a disposable spray, gel or liquid dispensing device that holds the activating agent internally and essentially hidden such that on use, the system appears to contain only one component (i.e., the polymerizable composition).

Even further, in an automated, semi-automated or professional trade environment, the system could substantially remain hidden and maintained on an infrequent basis by a supplier. Even if not hidden, a system requiring infrequent maintenance is also of significant value.

Further, systems that eliminate heat or energy intensive requirements, or chemical handling steps or equipment, facilitate energy efficient manufacturing processes that may be performed at higher speeds.

The principles disclosed in the context of the exemplary embodiments disclosed herein may be extended to other reactive systems as well. For example, use of the polymerizable compositions and activating agents and methods disclosed herein are applicable to injection molding, composite pultrusion and molding, and the like. Other examples include hot melt adhesives and in-line polymer formation for profiles, fibers, films and sheet goods. Still other examples include coating and ink application systems.

The following examples provide proof of concept for various methods of activating polymerizable compositions, polymerizable systems, and formulated products.

EXAMPLES

1. Encapsulated Systems

In an exemplary embodiment, a polymerizable system may include an activating agent carried in, but in inactivating engagement with, a polymerizable composition (e.g., mono-funtional-, difunctional-, or multifunctional-methylene malonates, such as DEMM, DMMM, di-n-propyl methylene malonate, di-isopropyl methylene malonate, dibenzyl methylene malonate, methylene β-ketoesters, and methylene β-diketones), specifically at concentrations of 2% by weight or less. It has been found that only enough activating agent to initiate or kick off polymerization is sufficient to facilitate effective polymerization. An exemplary system utilizes encapsulation of the activating agent, for example in a wax. Of course, many other encapsulation agents may be employed to accomplish the desired separation of the activating agent from the polymerizable composition.

For example, an activating agent (e.g., potassium benzoate, 1% solution in suitable solvent) may be encapsulated in wax (e.g., Carbowax 8000). The encapsulated activating agent can then be carried in a polymerizable composition without initiating cure. The encapsulated activating agent would therefore be rendered inert or non-reactive relative to a polymerizable composition. Application of mild heat, enough to melt the wax, would release the activating agent and initiate immediate polymerization. The activating agent may be present in a polymerizable composition at levels of less than about 2% by weight of the polymerizable composition, more preferably less than about 0.5% by weight of the polymerizable composition, and even more preferably, less than about 0.1% by weight of the polymerizable composition. The polymerizable system may be utilized as an ink, general adhesive, reactive pressure sensitive adhesive, reactive hot melt adhesive, a coating, a composite polymer matrix and the like. Those having skill in the art will appreciate that such a system may be formulated with formulation additives as previously mentioned.

In an alternate embodiment, the activating agent (e.g., potassium benzoate, 1% solution in suitable solvent) may be immobilized in a carrier such as wax (e.g., Carbowax 8000), and then re-encapsulated in another layer of wax, to ensure isolation of the activating agent. Again, the activating agent may be present in a polymerizable composition (e.g., mono-funtional-, difunctional-, or multifunctional-methylene malonates, such as DEMM, DMMM, di-n-propyl methylene malonate, di-isopropyl methylene malonate, dibenzyl methylene malonate, methylene β-ketoesters, and methylene β-diketones) at levels of less than about 2% by weight of the polymerizable composition, more preferably less than about 0.5% by weight of the polymerizable composition, and even more preferably, less than about 0.1% by weight of the polymerizable composition. Polymerizable compositions including monomer or oligomer components having di-functionality or multi-functionality will also cross-link during the polymerization reaction to impart improved properties to the final product.

In other alternate embodiments, the activating agent may be encapsulated into microspheres or other structures that initially separates the activating agent from the polymerizable composition. The polymerization can be initiated by breaking the integrity of the structure to allow activating engagement between the activating agent and the polymerizable composition.

In addition to the potassium benzoate mentioned above, the activating agent may be any agent as defined herein for initiating cure of the polymerizable composition.

In exemplary embodiments, the activating agent catalyzes the reaction and polymerization occurs very rapidly without additional mixing or energy input.

In an exemplary embodiment, a polymerizable system (e.g., a formulated product) may include an activating agent carried in, but not in activating engagement with, a polymerizable composition, specifically at a concentration below 2%. Of particular importance is that only enough activating agent to facilitate effective polymerization is required. Accordingly, the whole system need not be heated, only that portion required to release just enough activating agent. By example, a stream of hot air may be caused to envelope a stream of the composition or an atomized stream of the composition where only the surface need be heated. This dramatically reduces energy use as well as the ultimate temperature of the composition as it contacts the substrate. Accordingly, non heat sensitive substrates are enabled for use in manufacturing that otherwise might not be facile.

An experiment was run whereby NMR and DSC were utilized to monitor the reaction of DEMM with a wax encapsulated initiator. The results of the experiment show that when the encapsulating wax is heated above its melting point, the initiator is released, and polymerization occurs.

The polymerizable composition was DEMM (95% pure). The initiator was potassium benzoate encapsulated in Carbowax 8000. A control was run with Carbowax in DEMM, without initiator present.

NMR data was acquired to monitor the reaction. Because solvents would have an affect on the polymerization rate, samples were run neat. As such, only rough shimming was performed. In addition, because the wax particles tend to float to the surface of the liquid, it was necessary to set up the experiment below the melting point of the wax, remove the sample, heat the probe to above the melting point, insert a freshly shaken sample, and immediately acquire data without spending time to optimize the conditions. In liquid state to NMR, as the material polymerizes to a solid, the signal broadens out and "disappears."

Figure 1B:
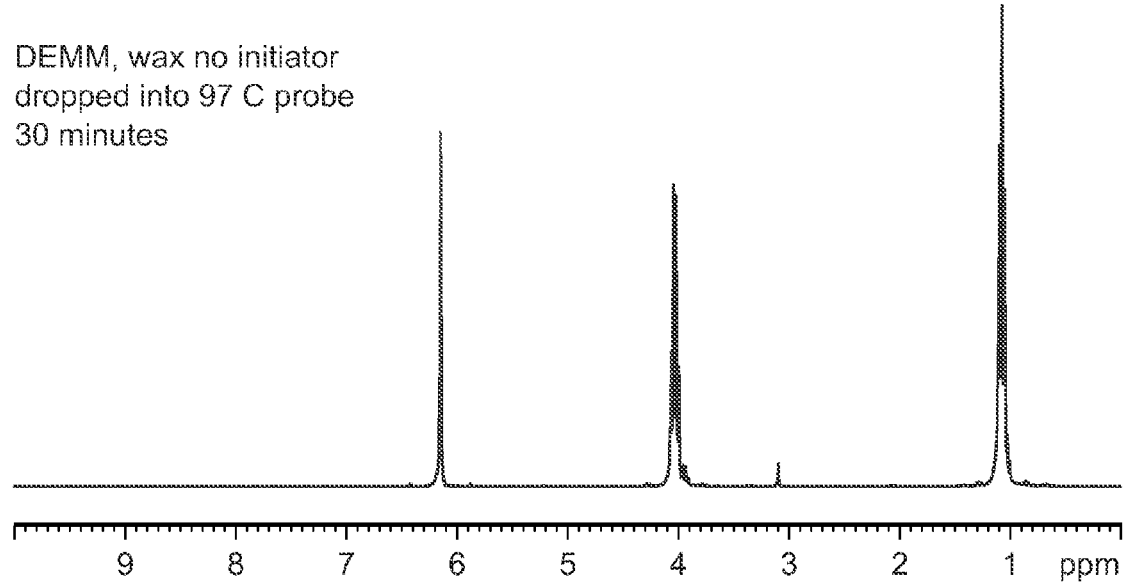
Figure 2A:
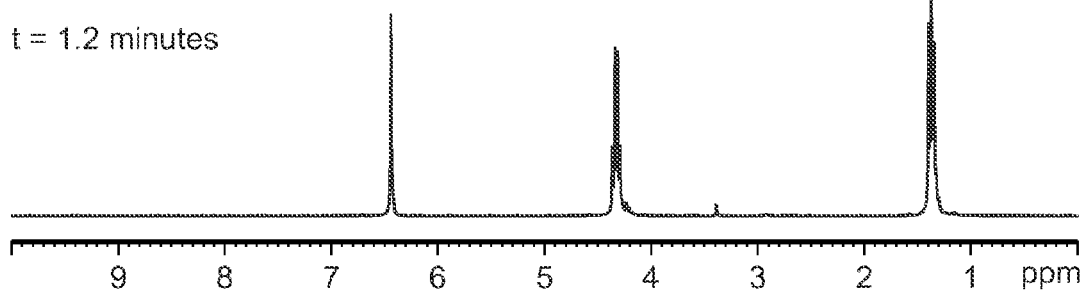
FIG. 2 shows the NMR spectra for DEMM and wax with initiator at time=70 s (FIG. 2a), 350 s (FIG. 2b), 490 s (FIG. 2c), and 630 s (FIG. 2d).
Figure 2B:
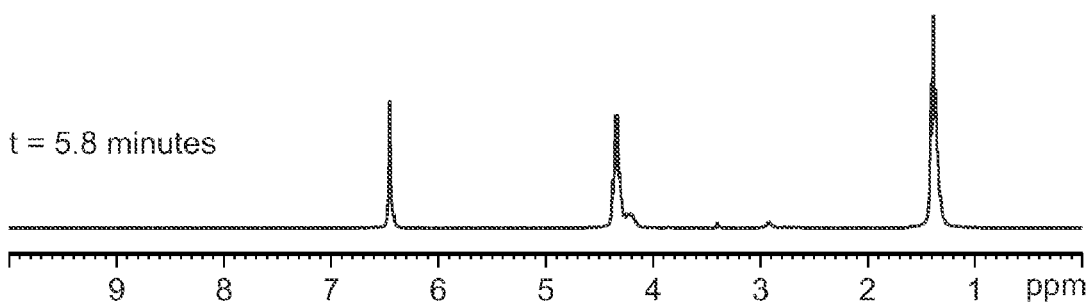
Figure 2C:
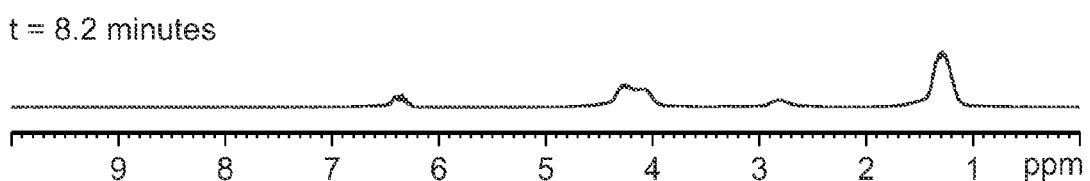
Figure 2D:
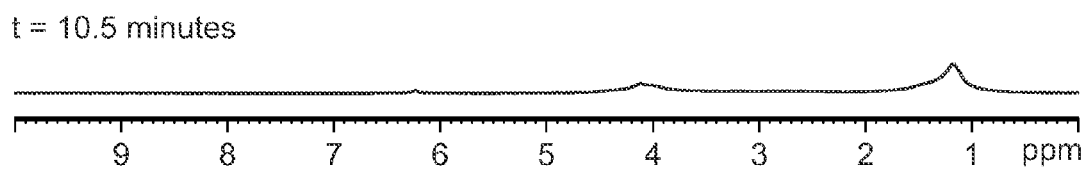

FIG. 1 shows the NMR spectra for DEMM and wax with no initiator at time=0 and 30 minutes at 97° C. No reaction was observed, indicating that the wax without initiator has no influence on the cure.

FIG. 2 shows the NMR spectra for DEMM and wax with initiator at time=70 s, 350 s, 490 s, and 630 s. The monomer double bond appears at 6.3 ppm, and can be see to disappear over time and a broadening of the signals due to the ethoxy groups. Because the cured material is solid, it is not observable by liquid state NMR, but a small signal can be seen at 2.7 ppm, which is due to the resulting backbone $CH_2$ of the polymer.

Figure 3:
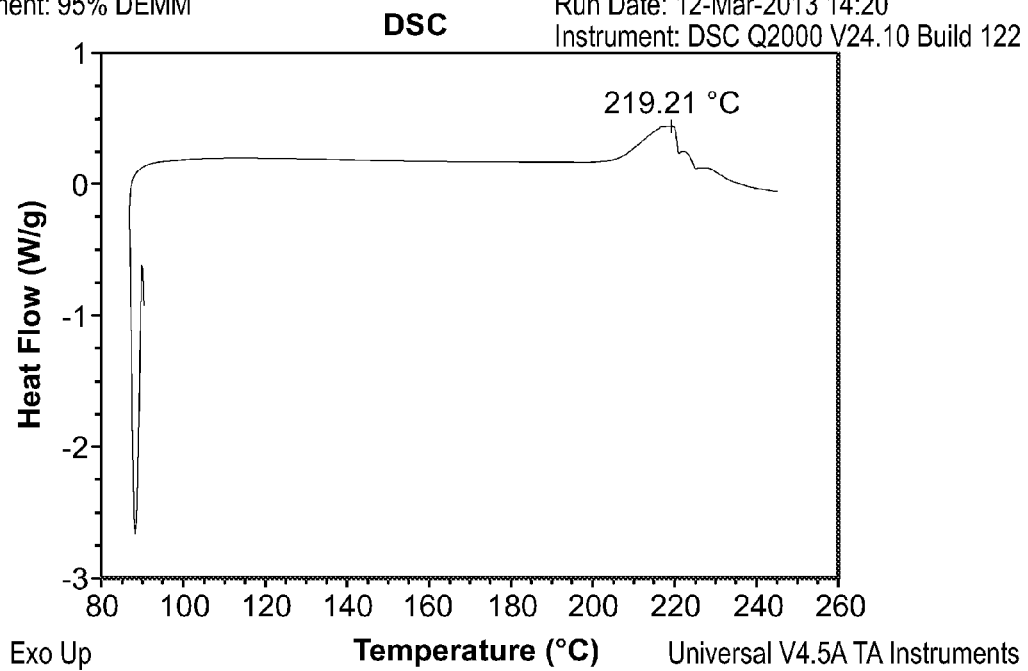
FIG. 3 shows the DSC trace for DEMM.

FIG. 3 shows the DSC results for DEMM by itself. The DEMM exotherms at 219° C. demonstrating DEMM can self-polymerize but only at very high temperatures.

Figure 4:
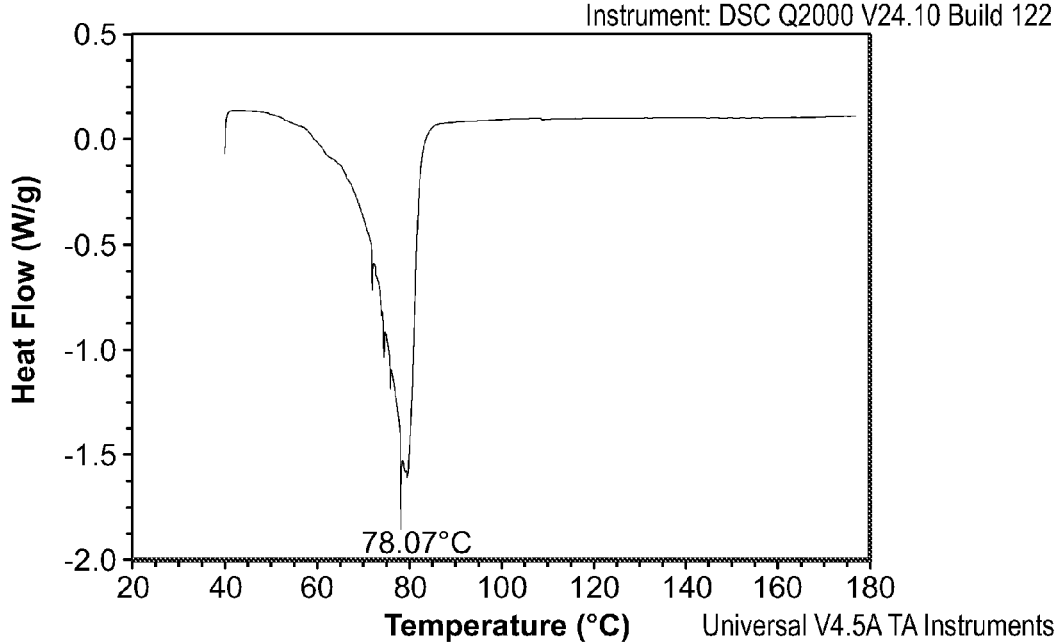
FIG. 4 shows the DSC trace for DEMM and wax with no initiator.

FIG. 4 shows the DSC results for DEMM and wax with no initiator. No exotherm is seen indicating no cure has taken place. There is, however, an endotherm at 78 C. due to the wax melting.

Figure 5:
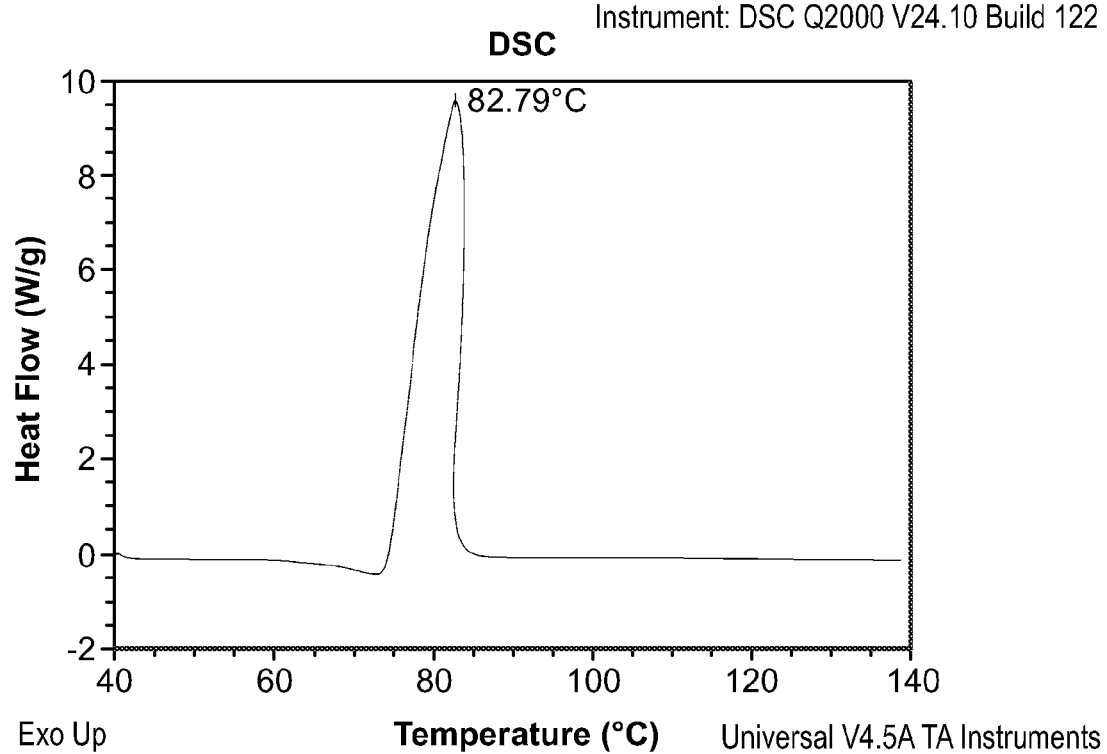
FIG. 5 shows the DSC trace for DEMM and wax with initiator.

FIG. 5 shows the DSC results for DEMM and wax with initiator. A large exotherm can be seen at 83 C due to the DEMM curing. It is likely since the exotherm was so large, it covered up any endotherm due to wax melting.

NMR

The temperature of the NMR probe was calibrated using pure ethylene glycol. The sample temperature was determined by the following equation: $T(K)=(4.637-Delta)/to 0.009967$, where Delta=the splitting (in ppm) between the CH2 and OH of the ethylene glycol.

DEMM and the wax or wax encapsulated initiator were added to NMR tubes. The samples were placed into the probe at 70 C. Because no lock solvent was used, samples were run without a deuterium lock. Shimming was performed manually on the spectrum. A 2 degree pulse was used to acquire data. The sample was removed from the probe. The probe was then heated to 97 C. empty. Once the probe was at temperature, the sample was inserted and data was acquired. A data file from single scans was acquired every 7 seconds.

DSC

DSC experiments were performed using a TA Q2000 DSC with a RCS 90 cooling system. DSC stands for differential scanning calorimetry and it measures the amount of heat it takes to raise the temperature of a reference and a sample at the same rate. Then comparing the sample and reference heat flows, one can see the sample's phase changes by the energy released or required. DEMM and wax were combined and then run in a hermetical sealed aluminum pan using a heat ramp program. All samples were heated at a rate of 10 C./min until a desired end point. When analyzing the data of the ramp, an endotherm indicates wax melting and an exotherm indicates the initiation of DEMM polymerization.

This proof of concept experiment illustrates separation by encapsulation of the activating agent from the polymerizable composition. Such systems could be tailored to achieve a desired outcome. For example, a wax having a different melting point, or provision of a different initiator or initiator concentration could provide tailored results.

2. Spray Systems

In an exemplary embodiment, a polymerizable system (e.g., a formulated product) may include an activating agent physically separated, and thus not in activating engagement with, a polymerizable composition. However, to an end user, the system has an appearance of a one-part system. In an exemplary embodiment, the polymerizable system is delivered to a substrate through a spray mechanism (e.g., hand-held spray gun). In an exemplary embodiment, the spray gun may include separate cartridges for separately containing the polymerizable composition and the activating agent. In an exemplary embodiment, one portal is used to deliver the polymerizable composition, and another portal is used to deliver the activating agent. The portals may be arranged in a nozzle such that the polymerizable composition and the activating agent do not contact each other in any significant way until they are in-flight or on the substrate surface. The polymerizable system may be designed so that polymerization starts on contact, or at a later time, as desired. The system may be designed for polymerization to be initiated or completed either before or after contacting a substrate.

In an exemplary embodiment, in-flight mixing is sufficient to initiate polymerization because thorough mixing and precise additions of activating agent are not required. For systems where polymerization is designed to be completed in flight, polymer particles of varying sizes can be manufactured.

In other exemplary embodiments, the spray mechanism may not be a hand-held spray gun, but may be part of a process where the polymerizable system is delivered in a continuous process, for example, by a robotic in-line feed. Again, the system is delivered to a substrate in a manner which keeps the polymerizable composition and the activating agent separated until contact between the two is desired. Those having skill in the art will appreciate that there are a variety of delivery methods that may be utilized using the principles disclosed herein and these examples are illustrative only, and not provided to limit the invention.

a. Liquid-Liquid

Steel panels (substrate) for testing were from ACT Test Panels LLC. During testing, the activating agent (initiator) was a solution of 1% by weight of sodium propionate dissolved in 2-butanol. The polymerizable composition was diethyl methylene malonate (DEMM, 99% pure). 2-Butanol was selected as the solvent for the initiator because it does not independently affect the polymerization of DEMM.

The polymer development process first involved placing the initiator and the polymerizable composition into two separate household spray bottles. The solutions were sprayed onto the steel substrate in different ways to test the initiation compatibility through different methods of mixing.

In the first trial, the initiator was sprayed on the steel substrate, then DEMM was sprayed on the steel substrate over top of the initiator. The second trial reversed the process—spraying the DEMM on the steel substrate first, followed by the initiator. The third trial involved spraying both the initiator and the DEMM simultaneously on the steel substrate so they mixed in flight and on the surface. All three trials resulted in the polymerization of DEMM.

Samples of each cured polymer were removed from the surface of the steel substrate and analyzed through Thermogravimetric Analysis (TGA) in order to determine the temperature of degradation for each polymer.

The results from the first trial (initiator was sprayed followed by the polymerizable composition), yielded a degradation temperature for the resulting polymer of 184° C. The results from the second trial (polymerizable composition was sprayed followed by the initiator), yielded a degradation temperature for the resulting polymer of 160° C. The results from the third trial (polymerizable composition and initiator were sprayed onto the surface simultaneously) yielded a degradation temperature for the resulting polymer of 159° C.

b. Liquid-Gas or Vapor Phase

In exemplary embodiments, similar or even better results can be obtained by having at least one of the components be in a gaseous or atomized state. For example, a handheld spray gun or other delivery system can be readily fashioned for this type of system because the amount of catalyst necessary to initiate the polymerization is so small, and complete mixing is not required.

Many other applications for this two-part system disguised as a one-part system are possible using the principles disclosed herein. For example, there are many adhesive applications delivered through nozzles, pumps, or syringes. The activating agent and polymerizable composition may be delivered in a manner that appears to be a one-part system to the end user, but is in reality a two-part (or more) system, due to the quick polymerization reaction that occurs upon contact of the activating agent with the polymerizable composition.

3. UV Activated Systems

It has been found that a polymerizable composition, namely DEMM at 97% purity, with radiation curable components ferrocene/n-butylferrocene/titanocene in combination with to Irgacure 819 (photoinitiator-phosphine oxide type) upon exposure to UV radiation does not exhibit any polymerization. However, polymerization of certain polymerizable cyanoacrylate (CA) formulated compositions can be initiated by UV techniques. See for example, U.S. Pat. No. 5,922,783 to Wojciak. Further, it has been found that certain CA formulated compositions are compatible (stable) with DEMM compositions. Therefore, a reactive (polymerizable) system can be formulated wherein the DEMM polymerizable composition is effectively doped with CA formulated composition. When acted upon by UV radiation, the CA formulated composition begins polymerizing and effectively initiates polymerization of the DEMM. Although not wishing to be held to any particular theory, it is believed that the DEMM polymerization occurs through a free-radical mechanism. Thus, the CA formulated composition acts as a benign or inactive agent until exposure to a sufficient source of UV radiation. In an exemplary embodiment, the activating amount of the CA formulated composition in DEMM is greater than or equal to 25%. Further optimization of this technique could lead to reduction in the activating amount.

Example 1

CA formulations containing photo-initiators (e.g., Irgacure 819, bisacylphospine oxide) and metalolocene(s) (ferrocen/n-butyl ferrocene) respond very well to UV curing mechanism. UV initiated cure was observed when DEMM composition was combined with the CA formulations at the 1:1 ratio.

Example 2

Three masterbatches were made:
1. DEMM with 1% Irgacure 819 and 500 ppm ferrocene.
2. Same as above with n-butyl ferrocene
3. Same as (1) with titanocene dichloride Each of the masterbatch formulations and CA monomer were added via a small to pipette in a 2:1 drop ratio of the masterbatch formulation to CA monomer onto glass slides and exposed to a Fusion light source (D bulb) @ belt speed setting 2. After UV exposure for approximately 10-20 seconds the samples exhibited polymerization to some extent but slightly tacky.

The procedure was repeated with the addition of some Genocure CPK (hydroxyl cyclophenylketone) at 300-500 ppm. The same UV exposure was tried. The composition cured without noticeable tackiness.

The procedure was repeated using a 3:1 ratio and same UV exposure. The composition was somewhat cured but tacky.

Those having skill in the art will appreciate that sources of radiation, other than a Fusion UV chamber may be utilized. For example, black light and even sunlight can provide the desired radiation. The exemplary embodiments are provided as examples only and not by way of limiting the invention.

4. Fabric/Fiber/Paper Applications

Polymerizable systems as disclosed herein may be utilized in bonding and/or coating various fabrics, fibers, papers or other such substrates. For example, the activating agent may be present on the substrate as sizing or other pre-treatment.

It has been found that polymerizable systems such as the ones disclosed herein polymerize and bond on fiberglass and carbon fiber substrates. Proof of this concept therefore leads to envisioning that the activating agent may be carried on the substrate and when polymerization is desired, the polymerizable composition may be introduced to the substrate. The following examples illustrate successful polymerization on fiberglass and carbon fibers/fabric.

a. Fiberglass Fabric

The fiberglass material used during testing was 2.5 oz fiberglass cloth. The final composite product was intended to be a composite mat of the fiberglass cloth material.

The fiberglass cloth was first cut and prepared into squares of two inches by two inches in size. These layers were laid out individually on the lab bench to prepare for bonding. The activating agent (initiator) used for adhesive bonding was a solution of 3% by weight 1,8-Diazabicycloundec-7-ene (DBU) in Acetone. The polymerizable composition (adhesive bonding agent) used for composite preparation was 99% pure DEMM.

Using a 3 mL dropper, half of the fiberglass sheets were saturated with the initiator solution, and the remaining half of the fiberglass sheets were saturated with the DEMM. The fiberglass mat composite was then prepared by layering the individual squares of the fiberglass material. The order of layering involved an alternating system, where the sandwich of fiberglass material was comprised of a layer of fiberglass saturated with the initiator followed by a layer saturated with the adhesive bonding agent, which was then followed by a layer saturated with the initiator, and so on. A rubber roller was used to compress the composite sandwich after all the layers had been put in place.

During the curing process, a small amount of heat was exhibited from the composite product. The cure speed was very rapid producing a composite that can be handled within roughly 2 minutes. After the initial cure, the sample was conditioned for 24 hours resulting in a rigid fiberglass composite.

b. Carbon Fiber/Fabric

The carbon material used during testing was woven carbon fiber cloth. The final composite product was intended to be a composite mat of the carbon fiber cloth material.

The carbon fiber cloth was first cut and prepared into squares of two inches by two inches in size. These layers were laid out individually on the lab bench to prepare for bonding. The activating agent (initiator) used was a solution of 3% by weight 1,8-Diazabicycloundec-7-ene (DBU) in Acetone. The polymerizable composition used for composite preparation was DEMM (99% pure).

Using a 3 mL dropper, half of the carbon fiber sheets were saturated with the initiator solution, and the remaining half of the carbon fiber sheets were saturated with the polymerizable composition. The carbon fiber mat composite was then prepared by layering the individual squares of the carbon fiber material. The order of layering involved an alternating system, where the sandwich of carbon fiber material was comprised of a layer of carbon fiber saturated with the initiator followed by a layer saturated with the polymerizable composition, which was then followed by a layer saturated with the initiator, and so on. A rubber roller was used to compress the composite sandwich after all the layers had been put in place.

During the curing process, a small amount of heat was exhibited from the composite product. The cure speed was very rapid producing a composite that can be handled within roughly 2 minutes. After the initial cure, the sample was conditioned for 24 hours resulting in a rigid carbon fiber composite.

5. Polymerization Via Free Radical Initiator

Example: AIBN (Azobisisobutyronitrile) was dissolved into 2 grams of DEMM at a concentration of 0.6 mole % in a flask using a magnetic stirrer. The solution was degassed with nitrogen and kept under a nitrogen blanket. The solution was stirred and heated to 6° C. A slightly yellow color and viscous flow was observed after 2 hours at 60 C. The polymerization was terminated at 4.5 hours when the stir bar seized.

The crude material was purified by overnight stifling of the polymer in acetone yielding a white mass of 1.65 g following filtration and drying. The thermal decomposition analysis under nitrogen was 299 C. at 50% loss.

A control experiment was carried out by with the absence of free radical initiator by repeating the procedure; there was no color formation or viscous flow during the experiment.

6. Activation of DEMM

Procedure:

Aluminum coupons from Q-Labs, 1"×4", were rinsed with isopropyl alcohol and wiped clean with kimwipes, rinsed again and allowed to air dry.

Prepared primer solutions of Tetrabutylammonium Fluoride (lot# C08T046, Sigma Aldrich), Tetrabutylammonium Chloride (lot# BCBJ7890V, Sigma Aldrich), Tetrabutylammonium Bromide (lot# MKBK8505V, Sigma Aldrich), Tetrabutylammonium Iodide (lot# BCBJ2990V, Sigma Aldrich), Sodium Benzoate, Sodium Acetate (lot# MKBJ8668V, Sigma Aldrich), Potassium Acetate (lot# SLB02551V, Sigma Aldrich), 4,N,N-Trimethylaniline (lot# MKBH7547V, Sigma Aldrich), 1,1,3,3-tetramethylguanidine (lot# SHBL3556V, Sigma Aldrich), 1-Allyl-3-methylimidazolium Chloride (lot# BCBF0130V, to Sigma Aldrich), and Indene (lot# MKBH4027V, Sigma Aldrich) where dissolved in ethanol. While sodium aluminate (supplied from The Shepherd Chemical Company, Cincinnati, Ohio) was dissolved in deionized water. The preparation of the primer solutions involved the mixing of the two components while allowing for as much as 24 hours to stir with heat at 50 C.

The primers were casted on the aluminum coupons and allowed 2 hours to dry at ambient conditions; 70-75 F., 30-35% RH. For the cast of sodium aluminate, the casted film was dried with the aid of an 82 C. oven to drive the water off.

Approximately 100 mg of DEMM (95% pure) was placed on the primed surface. The polymerizations were completely dry within 3 hours following monomer addition.

After 24 hours, the polymer films were removed via a clean razor and submitted for thermal decomposition analysis under nitrogen or molecular weight determination. The activators sampled illustrate a wide variety of organic/inorganic bases and salts, neutral bases and super bases, ionic liquids, and a reactive hydrocarbon useful to initiate polymerization. The results are summarized in Tables 1-5:

TABLE 1

Anion effects of organic salts

| Initiator | Initiator conc. | Mw |
|---|---|---|
| Tetrabutylammonium Fluoride | 0.46% | 170K |
| Tetrabutylammonium Chloride | 0.58% | 810K |
| Tetrabutylammonium Bromide | 0.65% | 174K |
| Tetrabutylammonium Iodide | 0.80% | 224K |

TABLE 2

Cation effects of organic salts

| Initiator | Initiator conc. | Td C (95%) |
|---|---|---|
| Sodium Benzoate | 0.48% | 176 |
| Sodium Acetate | 0.48% | 180 |
| Potassium Acetate | 0.44% | 187 |

TABLE 3

Amines and Guanidines

| Initiator | Initiator conc. | Mw |
|---|---|---|
| 4,N,N-Trimethylaniline | 0.73% | 178K |
| 1,1,3,3-Tetramethylguanidine | 0.67% | 357K |

TABLE 4

Inorganic Salts

| Initiator | Initiator conc. | Mw (GPC) |
|---|---|---|
| Sodium Aluminate | 0.83% | 261K |

TABLE 5

Ionic Liquids and Hydrocarbons

| Initiator | Initiator conc. | Td C (95%) |
|---|---|---|
| 1-Allyl-3-methylimidazolium Chloride | 0.58% | 210 |
| Indene | 0.62% | 211 |

7. Polymerization of Various Methylene Malonates

Following the procedure presented above, a family of methylene malonates were polymerized using a 1.0% primer solution of 1,2,3,3-tetramethylguanidine. The polymerizations were complete within 5 hours at ambient conditions, 22 C., 31% relative humidity. Samples were submitted for thermal decomposition analysis under nitrogen. The results are summarized in Table 6.

The general structural formula for methylene malonates is R1-O—C(O)—C(CH2)-C(O)—O—R2. Table 6 provides a family of methylene malonates having various R1 and R2 groups.

Additionally, Table 6 includes a crosslinking Multifunctional Blend. Multifunctional monomers (including difunctional monomers) and polymerizable compositions are disclosed in co-pending patent application PCT/US12/60830 entitled Multifunctional Monomers, Methods For Making Multifunctional Monomers, Polymerizable Compositions And Products Formed Therefrom, incorporated herein in its entirety. In an exemplary embodiment, a multifunctional monomer is obtained by the transesterification of diethyl methylene malonate (DEMM) and 1,6-hexanediol (HD):

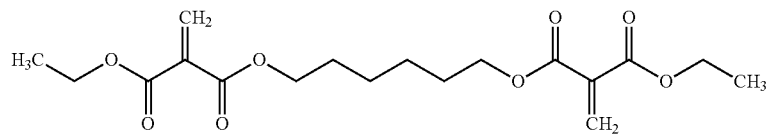 [SMILES: C=C(C(=O)OCC)C(=O)OCCCCCCOC(=O)C(=C)C(=O)OCC]

referenced herein as "Multifunctional (DEMM/HD) product".

This particular multifunctional (DEMM/HD) product is provided for exemplary purposes only and not by way of limitation. An exemplary multifunctional polymerizable composition includes: approximately 85% by weight DEMM, approximately 10% by weight Multifunctional (DEMM/HD) product, and approximately 5% by weight other (including diethyl malonate (DEM)), referenced herein as "Multifunctional Blend."

TABLE 6

Family of Methylene Malonates

| Polymer | R1 | R2 | Td C (95%) |
|---|---|---|---|
| 1 | Methyl | Ethyl | 151 |
| 2 | Methyl | n-Hexyl | 183 |
| 3 | Ethyl | n-Propyl | 234 |
| 4 | Ethyl | n-Butyl | 182 |
| 5 | Isopropyl | Isopropyl | 221 |
| 6 | Multifunctional Blend | | 260 |

The methylene malonate compounds provided in Table 6 are merely exemplary and similar polymerization reactions would be expected with other di-activated vinyl compounds (e.g., methylene betaketoesters, methylene beta di-ketones, etc) and other difunctional/multifunctional materials.

Thus, exemplary embodiments disclosed herein provide polymerizable compositions, suitable initiators, and various methods for activating polymerization. Polymerization may be activated by initiators applied or inherently present to a substrate, in flight in a spray system, through UV mechanisms, by removal or breakdown of a separation system (e.g., to encapsulation), through gas-phase interaction, or through release of a free radical, for example.

The systems disclosed herein are applicable, without limitation as general adhesives, reactive pressure sensitive adhesives, reactive hot melt adhesives, sealants, coatings, inks, polymer matrices for composites, and the like. Further, exemplary embodiments disclosed herein reduce or eliminate heat or other energy intensive activation means. Exemplary embodiments disclosed herein provide very quick or instantaneous cure speeds able to improve manufacturing throughput. Exemplary embodiments disclosed herein provide the environmentally friendly aspect of low levels of fugitive catalyst use. Exemplary systems disclosed herein can also be designed to be biologically benign, compostable, digestible, metabolically compatible and/or recyclable.

EQUIVALENTS

Those skilled in the art will recognize, or be able to ascertain using no more than routine experimentation, many equivalents to the specific embodiments of the invention described herein. Such equivalents are intended to be encompassed by this invention.

What is claimed is:

1. A polymerizable system comprising:
a polymerizable composition; and
polymerization activator carried in inactive engagement in the polymerizable composition;
wherein the polymerizable composition comprises a di-activated vinyl compound, and
wherein the polymerization activator is made available to polymerize the polymerizable composition upon a phase change.

2. The polymerizable system according to claim 1 wherein the phase change is enabled by a change in the temperature of the system, dissolving the polymerization activator, addition of a solubilizing plasticizer, releasing the polymerization activator from a physical separation means, or converting the polymerization activator from an inert state to an active state.

3. The polymerizable system of claim 2 wherein the polymerizable composition comprises a methylene malonate, a methylene beta-ketoester or a methylene beta-diketone and wherein the polymerization activator is converted from the inert state to the active state upon activation by UV radiation.

4. The polymerizable system according to claim 1 wherein the polymerization activator is at least one of a base, a base enhancer, a base creator, or a base precursor.

5. The polymerizable system according to claim 1 wherein the polymerizable composition is at least one of a methylene malonate, a methylene beta-ketoester, a methylene beta-diketone, a dialkyl disubstituted vinyl, a dihaloalkyl disubstituted vinyl, whether a monofunctional, difunctional, or multifunctional form thereof.

6. The polymerizable system according to claim 1, wherein the polymerization activator comprises a basic material selected from a strong base (pH over 9), a moderately strong base (pH from 8-9), or a weak base (pH from over 7 to 8), or a combination thereof.

7. The polymerizable system according to claim 1, wherein the polymerization activator comprises a basic material selected from an organic material, an inorganic material or an organo-metallic material, or a combination thereof.

8. The polymerizable system of claim 7 wherein the polymerization activator is at least one member selected from: sodium acetate; potassium acetate; acid salts of sodium, potassium, lithium, copper, and cobalt; tetrabutyl ammonium fluoride, chloride, and hydroxide; an amine whether primary, secondary or tertiary; an amide; salts of polymer bound acids; benzoate salts; 2,4-pentanedionate salts; sorbate salts; propionate salts; secondary aliphatic amines; piperidene, piperazine, N-methylpiperazine, dibutylamine, morpholine, diethylamine, pyridine, triethylamine, tripropylamine, triethylenediamine, N,N-dimethylpiperazine, butylamine, pentylamine, hexylamine, heptylamine, nonylamine, decylamine; salts of amines with organic monocarboxylic acids; piperidine acetate; metal salt of a lower monocarboxylic acid; copper(II) acetate, cupric acetate monohydrate, potassium acetate, zinc acetate, zinc chloracetate, magnesium chloracetate, magnesium acetate; salts of acid containing polymers; or salts of polyacrylic acid co-polymers.

9. The polymerizable system according to claim 1 wherein the polymerization activator is present in the polymerizable composition in amounts less than about 2% by weight of the polymerizable composition.

10. The polymerizable system of claim 1 wherein the polymerizable composition is provided through an environmentally sustainable process.

11. The polymerizable system of claim 1 wherein the polymerizable composition is environmentally benign, biologically benign, or both.

12. The polymerizable system of claim 1 wherein the polymerizable composition is curable at ambient temperature.

13. The polymerizable system of claim 1, wherein the polymerizable composition is storable at ambient temperature.

14. The polymerizable system of claim 1 wherein the polymerization activator is encapsulated in a wax.

15. The polymerizable system of claim 1, wherein the activating agent is provided in inactive engagement with the polymerizable composition by chemical inactivation.

16. The polymerizable system of claim 1, for use in a product selected from: an ink, general adhesive, reactive pressure sensitive adhesive, reactive hot melt adhesive, a coating, a composite polymer matrix and combinations thereof.

17. A polymerizable system comprising:
a polymerizable composition; and
polymerization activator physically separated from the polymerizable composition;
wherein the polymerizable composition comprises a di-activated vinyl compound, and
wherein the polymerization activator is able to initiate polymerization upon contact with the polymerizable composition without substantial mixing.

18. The polymerizable system according to claim 17 wherein the physical separation is achieved by storing the activating agent and the polymerizable composition in separate locations within an applicator means.

19. The polymerizable system according to claim 18 wherein the applicator means is an aerosol spray device.

20. The polymerizable system according to claim 17 wherein the physical separation is achieved by initially applying the polymerization activator to at least a portion of a substrate, followed by applying the polymerizable composition to the portion of the substrate.

21. The polymerizable system according to claim 17 wherein the physical separation is achieved by providing the polymerization activator in or on at least a portion of a substrate.

22. The polymerizable system according to claim 21 wherein the polymerization activator is in an inert state and wherein the polymerizable system further comprises an converting agent able to convert the polymerization activator from the inert state to an active state.

23. The polymerizable system according to claim 22 wherein the converting agent is a base enhancer or a base creator.

24. The polymerizable system according to claim 17, wherein the polymerization activator is provided in an amount effective to substantially cure the polymerizable composition.

25. The polymerizable system according to claim 24 wherein the amount effective to substantially cure the polymerizable composition is less than 2% by weight of the polymerizable composition.

26. The polymerizable system according to claim 17 wherein the polymerization activator is provided as a dispersion, a suspension, as a solute in a solvent, as an encapsulant.

27. A method of initiating the polymerization of a polymerizable composition comprising contacting a polymerizable composition with polymerization activator without substantial mixing, without addition of heat, without exposure to radiation, or any combination thereof, wherein the polymerizable composition comprises a di-activated vinyl compound.

28. The method according to claim 27 wherein the polymerizable activator contacts the polymerizable composition inside a dispenser immediately prior to dispensing onto a substrate.

29. The method according to claim 27 wherein the polymerizable activator exits a dispenser from a first pathway and the polymerizable composition exits the dispenser from a second pathway, and wherein the polymerizable activator contacts the polymerizable composition immediately after exiting the dispenser.

30. The method according to claim 27 wherein the polymerizable composition is applied to at least a portion of a substrate at substantially the same time that the polymerization activator is applied to the substrate portion, wherein the polymerizable composition contacts and mixes with the polymerization activator sufficiently to initiate polymerization.

31. The method according to claim 27 wherein the polymerization activator comprises a basic material selected from a strong base (pH over 9), a moderately strong base (pH from 8-9), or a weak base (pH from over 7 to 8), or a combination thereof.

32. The method according to claim 27, wherein the polymerization activator comprises a basic material selected from an organic material, an inorganic material or an organo-metallic material, or a combination thereof.

33. The method according to claim 32 wherein the polymerization activator is at least one member selected from: sodium acetate; potassium acetate; acid salts of sodium, potassium, lithium, copper, and cobalt; tetrabutyl ammonium fluoride, chloride, and hydroxide; an amine whether primary, secondary or tertiary; an amide; salts of polymer bound acids; benzoate salts; 2,4-pentanedionate salts; sorbate salts; propionate salts; secondary aliphatic amines; piperidene, piperazine, N-methylpiperazine, dibutylamine, morpholine, diethylamine, pyridine, triethylamine, tripropylamine, triethylenediamine, N,N-dimethylpiperazine, butylamine, pentylamine, hexylamine, heptylamine, nonylamine, decylamine; salts of amines with organic monocarboxylic acids; piperidine acetate; metal salt of a lower monocarboxylic acid; copper(II) acetate, cupric acetate monohydrate, potassium acetate, zinc acetate, zinc chloracetate, magnesium chloracetate, magnesium acetate; salts of acid containing polymers; or salts of polyacrylic acid co-polymers.

34. The method according to claim 27 wherein the polymerization activator is provided in an amount effective to substantially cure the polymerizable composition.

35. The method according to claim 34 wherein the amount effective to substantially cure the polymerizable composition is at least one of the following: less than 2%, less than 1%, less than 0.5%, and less than 0.1% by weight of the polymerizable composition.

36. The method according to claim 27, wherein the polymerization activator initiates polymerization of the polymerizable composition by an anionic attack mechanism.

37. The method of claim 27, wherein the polymerization activator initiates polymerization of the polymerizable composition by a free radical mechanism.

38. The method of claim 27, wherein the polymerization activator is in the form of a precursor.

39. The method of claim 38, further comprising converting the precursor into the polymerization activator.

40. The method of claim 27 wherein the polymerizable composition is selected from the group consisting of methylene malonates, methylene β-ketoesters, methylene β-di-ketones, dialkyl disubstituted vinyls, dihaloalkyl disubstituted vinyls, the monofunctional, difunctional, or multifunctional form thereof, and any combination thereof.

* * * * *